(12) United States Patent
Zheng et al.

(10) Patent No.: US 10,772,126 B2
(45) Date of Patent: Sep. 8, 2020

(54) COMMUNICATION METHOD ON UNLICENSED FREQUENCY BAND, TERMINAL DEVICE, AND NETWORK DEVICE

(71) Applicant: Huawei Technologies Co., Ltd., Shenzhen (CN)

(72) Inventors: Juan Zheng, Beijing (CN); Lei Guan, Beijing (CN); Sha Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 77 days.

(21) Appl. No.: 16/233,504

(22) Filed: Dec. 27, 2018

(65) Prior Publication Data
US 2019/0159255 A1 May 23, 2019

Related U.S. Application Data

(63) Continuation of application No. PCT/CN2016/087486, filed on Jun. 28, 2016.

(51) Int. Cl.
*H04W 48/16* (2009.01)
*H04W 72/04* (2009.01)
(Continued)

(52) U.S. Cl.
CPC ....... *H04W 74/0808* (2013.01); *H04L 5/0048* (2013.01); *H04L 25/0226* (2013.01);
(Continued)

(58) Field of Classification Search
None
See application file for complete search history.

(56) References Cited

U.S. PATENT DOCUMENTS

2016/0056935 A1* 2/2016 Damnjanovic ..... H04W 74/006 370/252
2016/0057731 A1 2/2016 Damnjanovic et al.
(Continued)

FOREIGN PATENT DOCUMENTS

CN 105072690 A 11/2015
CN 105162563 A 12/2015
(Continued)

OTHER PUBLICATIONS

"Discussion on Random Access Procedure for eLAA," Agenda Item: 6.2.1.4, Source: Samsung, Document for: Discussion and Decision, 3GPP TSG RAN WG1 Meeting #85, R1-164749, Nanjing, China, May 23-27, 2016, 4 pages.
(Continued)

*Primary Examiner* — Duc T Duong
(74) *Attorney, Agent, or Firm* — Slater Matsil, LLP

(57) ABSTRACT

A communication method includes receiving, by a terminal device, on an unlicensed frequency band, downlink control information sent by a network device, where the downlink control information is within a first time unit in a candidate time unit set of a plurality of candidate time unit sets, where the candidate time unit set is at least one of a plurality of consecutive time units, and wherein the candidate time unit sets are at equal intervals in the plurality of consecutive time units. The method further includes determining, by the terminal device according to a time at which the downlink control information is sent, a time window for sending uplink information, and sending, by the terminal device, the uplink information within the time window, where a start moment T1 of the time window is within the first time unit or a second time unit immediately after the first time unit.

18 Claims, 6 Drawing Sheets

(51) Int. Cl.
*H04W 74/08* (2009.01)
*H04L 5/00* (2006.01)
*H04L 25/02* (2006.01)
*H04W 16/14* (2009.01)
*H04W 74/00* (2009.01)

(52) U.S. Cl.
CPC ........... *H04W 16/14* (2013.01); *H04W 48/16* (2013.01); *H04W 72/042* (2013.01); *H04W 72/0446* (2013.01); *H04L 5/0007* (2013.01); *H04W 74/004* (2013.01)

(56) References Cited

U.S. PATENT DOCUMENTS

| | | | |
|---|---|---|---|
| 2016/0165631 A1 | 6/2016 | Gao et al. | |
| 2016/0226637 A1* | 8/2016 | Nory | H04L 5/0053 |
| 2016/0233989 A1* | 8/2016 | Belghoul | H04L 5/0092 |
| 2017/0127444 A1 | 5/2017 | Goto et al. | |
| 2017/0164384 A1* | 6/2017 | Wang | H04L 5/0044 |
| 2017/0251464 A1* | 8/2017 | Mukherjee | H04W 72/14 |
| 2017/0280331 A1 | 9/2017 | Gou et al. | |
| 2017/0311346 A1* | 10/2017 | Chendamarai Kannan | H04L 5/0044 |
| 2017/0332358 A1* | 11/2017 | Park | H04W 74/0816 |
| 2018/0007688 A1* | 1/2018 | Fu | H04W 72/0406 |
| 2018/0027597 A1* | 1/2018 | Ahn | H04W 84/12 370/445 |
| 2018/0041314 A1* | 2/2018 | Lin | H04L 1/1887 |
| 2018/0069653 A1* | 3/2018 | Fujishiro | H04W 16/14 |
| 2018/0077699 A1* | 3/2018 | Matsumoto | H04W 72/0413 |
| 2018/0115904 A1* | 4/2018 | Harada | H04L 27/0006 |
| 2018/0124749 A1* | 5/2018 | Park | H04W 74/08 |
| 2018/0175975 A1* | 6/2018 | Um | H04L 1/1816 |
| 2019/0029045 A1 | 1/2019 | Li et al. | |
| 2019/0044670 A1 | 2/2019 | Li et al. | |

FOREIGN PATENT DOCUMENTS

| | | |
|---|---|---|
| CN | 105307180 A | 2/2016 |
| CN | 105517061 A | 4/2016 |
| CN | 105578573 A | 5/2016 |
| CN | 105657847 A | 6/2016 |
| EP | 3402281 A1 | 11/2018 |
| WO | 2015010602 A1 | 1/2015 |
| WO | 2015169397 A1 | 11/2015 |
| WO | 2015191963 A1 | 12/2015 |
| WO | 2016002533 A1 | 1/2016 |

OTHER PUBLICATIONS

"Frame Design and Signalling for LAA UL Based on FS3," Agenda Item: 7.3.1.5, Source: ZTE Microelectronics Technology, Nubia Technology, Document for: Discussion and Decision, 3GPP TSG RAN WG1 Meeting #84Bis, R1-162327, Apr. 11-15, 2016, 5 pages.

* cited by examiner

COMMUNICATION METHOD ON UNLICENSED FREQUENCY BAND, TERMINAL DEVICE, AND NETWORK DEVICE

CROSS-REFERENCE TO RELATED APPLICATIONS

This application is a continuation of International Application No. PCT/CN 2016/087486, filed on Jun. 28, 2016, the disclosure of which is hereby incorporated by reference in its entirety.

TECHNICAL FIELD

The present disclosure relates to the field of wireless communications, and in particular, to an unlicensed frequency band resource allocation method, a terminal device, and a network-side device.

BACKGROUND

At present, licensed frequency band resources are limited. To further increase a capacity, an operator may provide a data service for user equipment by using an unlicensed frequency band. Wireless Fidelity (Wi-Fi) is a main technology used on an unlicensed frequency band, but a wireless local network (WLAN) access point (AP) using the Wi-Fi technology has disadvantages with regard to mobility, security, quality of service (QoS), and multiuser scheduling processing. Applying a Long Term Evolution (LTE) technology to an unlicensed frequency band can not only effectively utilize an unlicensed frequency band resource, but also provide more favorable wireless access, thereby satisfying increasing mobile broadband service requirements.

In an LTE system, data sending or receiving on an unlicensed frequency band resource may be implemented by using a licensed-assisted access Licensed-Assisted Access Using LTE (LAA-LTE) system based on carrier aggregation (CA). Currently, an unlicensed frequency band considered to be used in LAA-LTE is an unlicensed frequency band of 5 GHz granted by state governments. A listen before talk (LBT) rule needs to be used when a wireless communications system occupies the unlicensed frequency band for communication. Usually, before transmitting data by using the unlicensed frequency band, a communications device (including a network device such as a base station and/or a terminal device) needs to first perform listening. Therefore, data sending or receiving performed by the communications device on the unlicensed frequency band resource is occasional.

When operating on the unlicensed frequency band, a network device first needs to perform clear channel assessment. When the clear channel assessment succeeds, the network device obtains a time resource segment on the unlicensed frequency band, and starts to transmit data according to a specific resource configuration manner (for example, according to a preconfigured frame structure). However, a transmission channel reserved for uplink information is set at intervals on the unlicensed frequency band. When a time range reserved for the uplink information overlaps with a time range in which the network device sends downlink user data, transmission of the downlink user data is interrupted, to reserve the unlicensed frequency band resource for uplink information transmission. As a result, transmission of the downlink user data of the network device fails, and efficiency of transmitting data on the unlicensed frequency band is decreased.

Therefore, a communications technology on an unlicensed frequency band needs to be provided, to improve efficiency of transmitting data on the unlicensed frequency band resource.

SUMMARY

Embodiments of the present disclosure provide a communications technology on an unlicensed frequency band, to properly configure an unlicensed frequency band resource and improve efficiency of transmitting data on the unlicensed frequency band.

The following technical solutions are used in the embodiments of the present disclosure to achieve the foregoing objectives.

According to a first aspect, a communication method on an unlicensed frequency band is provided, including receiving, by a terminal device, downlink control information sent by a network device, where the downlink control information is within a first time unit in a candidate time unit set, the candidate time unit set is at least one of a plurality of consecutive time units, and the candidate time unit sets are at an equal interval in the plurality of consecutive time units, determining, by the terminal device based on time at which the downlink control information is sent, a time window for sending uplink information, and sending, by the terminal device, the uplink information within the time window, where a start moment T1 of the time window is within the first time unit or a second time unit, and the second time unit is a next time unit of the first time unit.

In a possible design, an end moment of the downlink control information is T2, and the terminal device skips receiving downlink user data within a time interval between T1 and T2.

In a possible design, the sending, by the terminal device, the uplink information within the time window includes performing clear channel assessment (CCA), and sending the uplink information after the CCA assessment succeeds.

In a possible design, the terminal device receives indication information, where the indication information is used to indicate the terminal device whether the time window exists or indicate whether the terminal device is allowed to send the uplink information within the time window.

In a possible design, when downlink user data sent by the network device exists in the first time unit, the indication information indicates that the time window does not exist or the uplink information is not allowed to be sent within the time window.

According to a second aspect, a communication method on an unlicensed frequency band is provided, including sending, by a network device, downlink control information within a first time unit, where the first time unit is included in a candidate time unit set, the candidate time unit set is at least one of a plurality of consecutive time units, and the candidate time unit sets are at an equal interval in the plurality of consecutive time units, and receiving, by the network device, uplink information based on time at which the downlink control information is sent, where the uplink information is within a time window, where a start moment T1 of the time window is within the first time unit or a second time unit, and the second time unit is a next time unit of the first time unit.

In a possible design, an end moment of the downlink control information is T2, and the network device skips sending downlink user data within a time interval between T1 and T2.

In a possible design, the network device further sends indication information, where the indication information is used to indicate a terminal device whether time window exists or indicate whether the terminal device is allowed to send the uplink information within the time window.

In a possible design, when the network device sends downlink user data within the first time unit, the indication information indicates the terminal device that the time window does not exist or the terminal device is not allowed to send the uplink information within the time window.

According to a third aspect, a terminal device is provided, including a receiving unit, configured to receive downlink control information sent by a network device, where the downlink control information is within a first time unit in a candidate time unit set, the candidate time unit set is at least one of a plurality of consecutive time units, and the candidate time unit sets are at an equal interval in the plurality of consecutive time units, a processing unit, configured to determine, based on time at which the downlink control information is sent, a time window for sending uplink information, and a sending unit, configured to send the uplink information within the time window, where a start moment T1 of the time window is within the first time unit or a second time unit, and the second time unit is a next time unit of the first time unit.

In a possible design, an end moment of the downlink control information is T2, and the receiving unit skips receiving downlink user data within a time interval between T1 and T2.

In a possible design, the sending, by the sending unit, the uplink information within the time window includes performing clear channel assessment (CCA), and sending the uplink information after the CCA assessment succeeds.

In a possible design, the receiving unit further receives indication information, where the indication information is used to indicate the terminal device whether the time window exists or indicate whether the terminal device is allowed to send the uplink information within the time window.

In a possible design, when downlink user data sent by the network device exists in the first time unit, the indication information indicates that the time window does not exist or the uplink information is not allowed to be sent within the time window.

In a possible design, a functional unit of the terminal device in this aspect may be implemented by using corresponding hardware, or may be implemented by corresponding hardware executing corresponding software.

According to a fourth aspect, a network device is provided, including a sending unit, configured to send downlink control information within a first time unit, where the first time unit is included in a candidate time unit set, the candidate time unit set is at least one of a plurality of consecutive time units, and the candidate time unit sets are at an equal interval in the plurality of consecutive time units, and a receiving unit, configured to receive uplink information based on time at which the downlink control information is sent, where the uplink information is within a time window, where a start moment T1 of the time window is within the first time unit or a second time unit, and the second time unit is a next time unit of the first time unit.

In a possible design, an end moment of the downlink control information is T2, and the sending unit skips sending downlink user data within a time interval between T1 and T2.

In a possible design, the sending unit is further configured to send indication information, where the indication information is used to indicate a terminal device whether the time window exists or indicate whether the terminal device is allowed to send the uplink information within the time window.

In a possible design, when the sending unit sends downlink user data within the first time unit, the indication information indicates the terminal device that the time window does not exist or the terminal device is not allowed to send the uplink information within the time window.

In a possible design, a functional unit of the terminal device in this aspect may be implemented by using corresponding hardware, or may be implemented by corresponding hardware executing corresponding software.

In view of the foregoing aspects, an embodiment of the present disclosure may further include the following possible designs.

In a possible design, the start moment T1 of the time window is a start moment of the second time unit, or the end moment T2 of the downlink control information is an $n^{th}$ OFDM symbol within the first time unit, and the start moment T1 of the time window is an $(n+2)^{th}$ OFDM symbol within the first time unit. For example, T2 is an end moment of an $n^{th}$ OFDM symbol within the first time unit, and T1 is a start moment of an $(n+2)^{th}$ OFDM symbol within the first time unit.

In a possible design, the end moment of the downlink control information is T2, and a time interval T between T1 and T2 is a receive/transmit transition time.

In a possible design, the downlink control information includes a discovery reference signal DRS and/or common control information.

In a possible design, the uplink information includes one or more of uplink information in a random access process, an uplink transmission scheduling request (SR), a sounding reference signal (SRS), and periodic channel state information (P-CSI).

In a possible design, the time unit is a subframe.

In a possible design, the candidate time unit set may include one or more time units.

It can be learnt from the foregoing that according to the solutions provided in the embodiments of the present disclosure, the time interval between the moment at which the terminal device stops receiving the downlink control information and the start moment of the time window for sending the uplink information is reduced. In such a manner, impact on transmission of downlink user data on an unlicensed frequency band is decreased, and efficiency of transmitting data on the unlicensed frequency band is improved.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 5-1 is a possible schematic diagram of resource allocation on an unlicensed frequency band according to an embodiment of the present disclosure;

FIG. 5-2 is another possible schematic diagram of resource allocation on an unlicensed frequency band according to an embodiment of the present disclosure;

FIG. 5-3 is still another possible schematic diagram of resource allocation on an unlicensed frequency band according to an embodiment of the present disclosure;

FIG. 6-1 is a possible schematic diagram of resource allocation in a candidate time unit set on an unlicensed frequency band according to an embodiment of the present disclosure;

FIG. 6-2 is another possible schematic diagram of resource allocation in a candidate time unit set on an unlicensed frequency band according to an embodiment of the present disclosure;

DETAILED DESCRIPTION OF ILLUSTRATIVE EMBODIMENTS

The following describes the technical solutions in the embodiments of the present disclosure with reference to the accompanying drawings in the embodiments of the present disclosure. It should be noted that, the embodiments of the present disclosure and features in the embodiments can be combined with each other provided that no conflicts exist.

Figure 1:
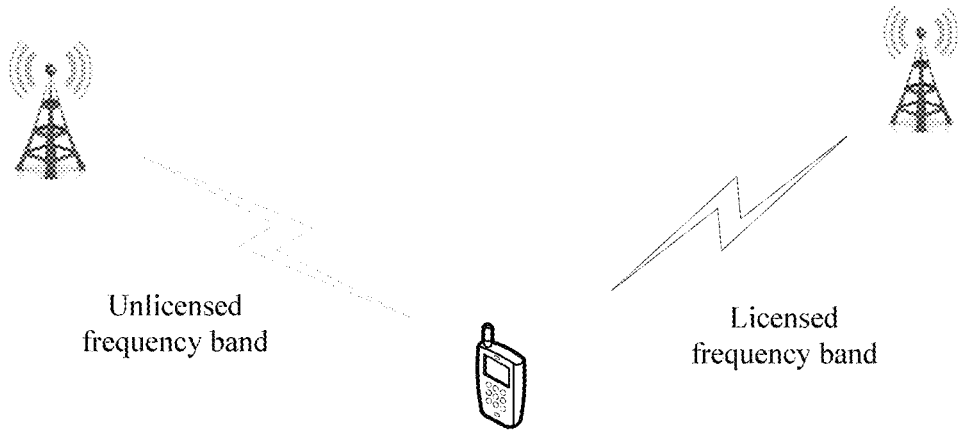
FIG. 1 is a schematic diagram of an application scenario of communication on an unlicensed frequency band according to an embodiment of the present disclosure.

The solutions in the present disclosure are applied to a wireless communications system, and in particular, to an LTE system using an unlicensed frequency band for communication, for example, a licensed-assisted access LAA-LTE (LAA-LTE) system, an LTE system based on dual connectivity (DC), and a standalone LTE in unlicensed spectrum (standalone LTE-U for short) system. Using an LAA-LTE system as an example, a specific scenario is shown in FIG. 1. By using a carrier aggregation (CA) technology, an LTE device may use a licensed frequency band carrier as a primary component carrier (PCC), and use an unlicensed frequency band carrier as a secondary component carrier (SCC) or a secondary serving cell (SCell). In this way, the LTE device can obtain a conventional wireless communication advantage by using the licensed frequency band carrier, and can implement offloading by using the unlicensed frequency band carrier, to reduce load of the licensed frequency band carrier. When using an unlicensed frequency band resource, the LAA-LTE system needs to comply with use specifications of an unlicensed frequency band. In a specific network architecture, a licensed frequency band, a licensed frequency band carrier, or a cell operating on a licensed frequency band is used as a primary serving cell, and an unlicensed frequency band, an unlicensed frequency band carrier, or a cell operating on an unlicensed frequency band is used as a secondary serving cell. The primary serving cell and the secondary serving cell may be deployed at a same site or may be deployed at different sites. There is an ideal backhaul path between the two cells.

In addition, the network architecture may further include an independently deployed cell that operates on an unlicensed frequency band. That is, the cell that operates on the unlicensed frequency band, for example, a standalone LTE-U system, may directly provide an independent access function without assistance of a cell that operates on a licensed frequency band. The embodiments of the present disclosure are not limited to the foregoing network architecture, and may further include another network architecture that can implement the solutions provided in the embodiments of the present disclosure.

A network device mentioned in the present disclosure includes all network-side elements except a terminal device, and may be a base station, a cell, an access point, a core network, or an access network element. The base station may be configured to perform mutual conversion between a received over-the-air frame and an IP packet and serve as a router between a wireless terminal and a remaining portion of an access network, where the remaining portion of the access network may include an Internet protocol (IP) network. The base station may further coordinate attribute management of an air interface. For example, the base station may be a base station in a Global System for Mobile Communications (GSM) or a Code Division Multiple Access (CDMA) system, may be a NodeB in a Wideband Code Division Multiple Access (WCDMA) system, or may be an evolved NodeB (eNB or e-NodeB) in LTE. The cell may be a cell corresponding to a base station, and the cell may belong to a macro base station, or may belong to a base station corresponding to a small cell. The small cell herein may include a metro cell, a micro cell, a pico cell, a Femto cell, and the like. These small cells are characterized by a small coverage area and low transmit power, and are applicable to a high-rate data transmission service. The embodiments of the present disclosure are not limited to the foregoing network device, and may further include another network device that can implement the solutions provided in the embodiments of the present disclosure.

A terminal device mentioned in the present disclosure may be a device that provides a user with voice and/or data connectivity, a handheld device with a wireless connection function, or another processing device connected to a wireless modem. A wireless device or unit may be a mobile terminal, such as a mobile phone (or referred to as a "cellular" phone) or a computer that has a mobile terminal. For example, the mobile terminal may be a portable, pocket-size, handheld, computer built-in or vehicle-mounted mobile apparatus, and exchanges voice and/or data with a radio access network. For example, the mobile terminal may be a device such as a personal communications service (PCS) phone, a cordless telephone set, a Session Initiation Protocol (SIP) telephone set, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a user agent, a user device, or user equipment. The terminal device may further include a relay. A device that can perform data communication with the base station may be considered as a terminal device. Preferably, the terminal device in the present disclosure may alternatively be a terminal device in a non-radio-resource-connection state. This is not specifically limited in the embodiments of the present disclosure.

For the LTE system using an unlicensed frequency band, when the unlicensed frequency band is used for communication, a communications device that belongs to a Wireless Fidelity (Wi-Fi) communications system is most likely to contend for a resource with the LTE system. A resource contention method used in the Wi-Fi communications system is also a listen before talk (LBT) rule. A basic concept of the LBT is Before sending data on a channel, each communications device (a network device and/or a terminal device) needs to first check whether the current channel is idle, that is, check whether an adjacent node is occupying the channel to send data. This check process is referred to as clear channel assessment (CCA). If it is found in a time period that the channel is idle, the communications device can send data. In addition, generally, a time for sending data on the channel is limited, and in the limited time range, the communications device does not need to perform clear channel assessment. If it is found that the channel is occupied, the communications device cannot transmit data on the channel currently.

In the foregoing process, the communications device may check, in a manner such as signal detection and energy detection, whether the channel is idle. For example, in the signal detection manner, if a particular signal (for example, for a Wi-Fi system, the signal may be a preamble signal) is not found, it may be considered that the channel is idle. In this case, the communications device may perform data transmission by using the unlicensed frequency band. For another example, in the energy detection manner, if received or detected energy is less than a threshold, it may be considered that the channel is idle. In this case, the communications device may perform data transmission by using the unlicensed frequency band.

To utilize an unlicensed frequency band resource more effectively, an unfixed frame structure is applied to transmission of data on the unlicensed frequency band. The network device such as a base station or a cell may determine, based on downlink service load and/or uplink service load, or another factor, downlink user data transmission duration and/or uplink data transmission duration after the unlicensed frequency band resource is preempted, and may adjust modes of uplink and downlink transmission on the unlicensed frequency band resource depending on a service requirement, so as to improve utilization of the unlicensed frequency band resource. Further, usage of the unlicensed frequency band resource is restricted by a maximum channel occupancy time (MCOT). Duration of one continuous downlink user data transmission cannot be greater than the MCOT, duration of one continuous uplink data transmission cannot be greater than the MCOT, or a sum of duration of one continuous downlink user data transmission and duration of one continuous uplink data transmission cannot be greater than the MCOT. The MCOT herein means that after preempting the unlicensed frequency band resource, the network device or the terminal device may perform data transmission on the preempted unlicensed frequency band resource without assessing a maximum time length corresponding to availability of the unlicensed frequency band resource. A portion including downlink data burst and/or uplink data burst that are/is included in each transmission opportunity (TxOP) may be understood as a frame structure. Different TXOPs may include different frame structures, and transmission duration in the TXOP is not greater than the MCOT.

A reserved transmission channel is set on the unlicensed frequency band resource at intervals. The reserved transmission channel is used by the communications device to transmit information. The interval may be a periodic interval or an aperiodic interval, and a specific time interval is determined based on a type of transmission information. The reserved transmission channel may be a physical random access channel (PRACH), where the channel resource is periodically configured in time domain, may be an uplink resource used to transmit a scheduling request (SR), where the uplink resource is periodically configured in time domain, may be an uplink resource used to transmit a sounding reference signal (SRS), where the uplink resource is periodically configured in time domain, may be an uplink resource used to transmit a hybrid automatic repeat request acknowledgment (HARQ-ACK), where the HARQ-ACK includes at least an acknowledgment (ACK) and a negative acknowledgment (NACK), and the uplink resource used to transmit the HARQ-ACK is periodically configured in time domain, may be an uplink resource used to transmit channel state information (CSI), where the uplink resource is periodically configured in time domain, or may be a physical uplink control channel (PUCCH), where the channel resource is periodically configured in time domain.

That the reserved transmission channel is a PRACH is used as an example. The network device (for example, a base station or a cell) needs to perform data transmission by using an unlicensed frequency band resource, and after clear channel assessment is performed, the network device obtains, through contention, a resource segment on an unlicensed frequency band, where maximum duration is an MCOT. After obtaining, through contention, the unlicensed frequency band resource, the network device performs downlink user data transmission based on a configured frame structure. The configured frame structure may be determined depending on a downlink service requirement. If a reserved location of the PRACH on the unlicensed frequency band happens to be on the resource that is obtained through contention by the network device, the network device needs to interrupt downlink user data transmission even though a time length restricted by the MCOT is not reached after the network device obtains, through contention, the unlicensed frequency band resource, so that the resource reserved on the unlicensed frequency band is used for PRACH transmission. After PRACH transmission ends, the network device further needs to perform clear channel assessment again to determine whether the unlicensed frequency band resource is usable, and determine whether interrupted downlink user data transmission can be resumed. In this case, transmission of downlink data of the network device fails, and efficiency of transmitting data on the unlicensed frequency band is affected. In addition, before PRACH transmission is performed, the terminal device may also need to perform clear channel assessment to determine whether the unlicensed frequency band resource is usable. For example, if the reserved uplink resource is in an MCOT corresponding to downlink user data transmission, the terminal device may perform data transmission on the reserved uplink resource without assessing availability of the unlicensed frequency band resource. If the reserved uplink resource is beyond an MCOT corresponding to downlink user data transmission, the terminal device performs data transmission on the reserved uplink resource only after assessing availability of the unlicensed frequency band resource. This further decreases efficiency of transmitting data on the unlicensed frequency band.

Figure 2:
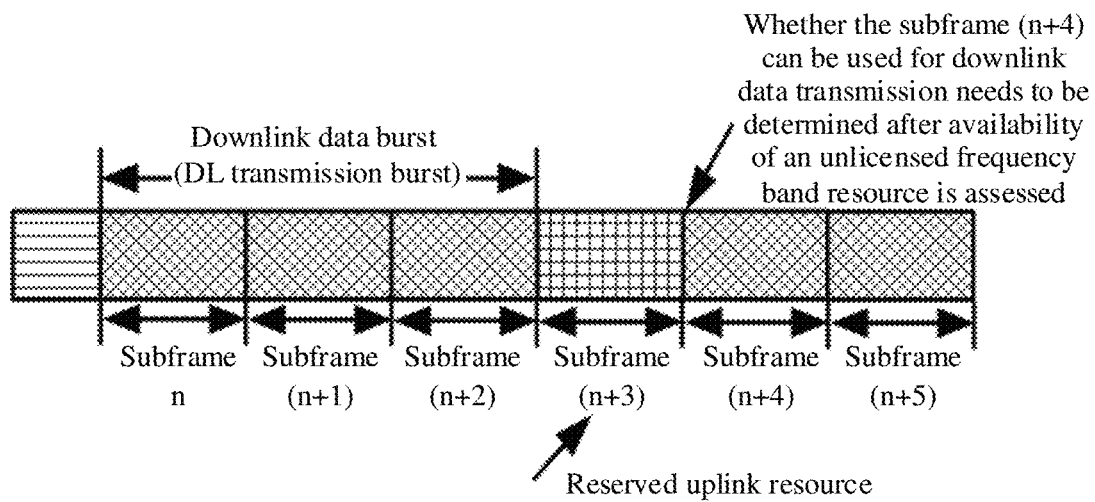
FIG. 2 is a schematic diagram of resource allocation on a prior-art unlicensed frequency band.

FIG. 2 shows an example. After CCA is performed, the network device determines that data transmission may be performed in a subframe n. Then, the network device starts to perform downlink user data transmission at a subframe start boundary of the subframe n, and stops performing data transmission at a subframe end boundary of a subframe (n+m) (m is equal to 5). Further, a length of time between the subframe start boundary of the subframe n and the subframe end boundary of the subframe (n+m) is not greater than an MCOT. However, in the time between the subframe start boundary of the subframe n and the subframe end boundary of the subframe (n+m), if a PRACH resource is in a subframe (n+k), where k is greater than 0 and less than m, the access network device can transmit downlink user data only from the subframe start boundary of the subframe n to a subframe end boundary of a subframe (n+k−1) (k=3). Then, the network device needs to perform CCA again to determine whether the downlink user data can continue to be sent. In addition, according to a time interval between an end moment of the downlink user data and a start moment of an uplink resource, the terminal device may also need to perform clear channel assessment before sending uplink information. Consequently, efficiency of transmitting data on an unlicensed frequency band is decreased.

Therefore, an embodiment of this disclosure provides a communications technology on an unlicensed frequency band. A data transmission location is properly configured on an unlicensed frequency band, to reduce impact on a design of a frame structure on the unlicensed frequency band and improve efficiency of transmitting data on the unlicensed frequency band.

It should be noted that, in the embodiments of the present disclosure, downlink control information may be a discovery reference signal (DRS), common control information (for example, downlink control information carried on a common control channel), or another type of downlink control information applicable to the embodiments of the present disclosure. The DRS includes one or more of a cell-specific reference signal (CRS), a secondary synchronization signal (SSS), a primary synchronization signal (PSS), and a configurable channel state information reference signal (CSI-RS). The common control information includes all or some of information carried in a system information block type 1 (SIM1), all or some of information carried on a physical broadcast channel (PBCH), or all or some of information carried in another system information block type (SIB).

It should be noted that in the embodiments of the present disclosure, the uplink information may be at least one piece of the following information all or some of uplink information included in a physical random access channel (PRACH), a sounding reference signal (SRS), a transmission scheduling request (SR), periodic channel state information (CSI) or the like, or another type of uplink information applicable to the embodiments of the present disclosure.

Figure 3:
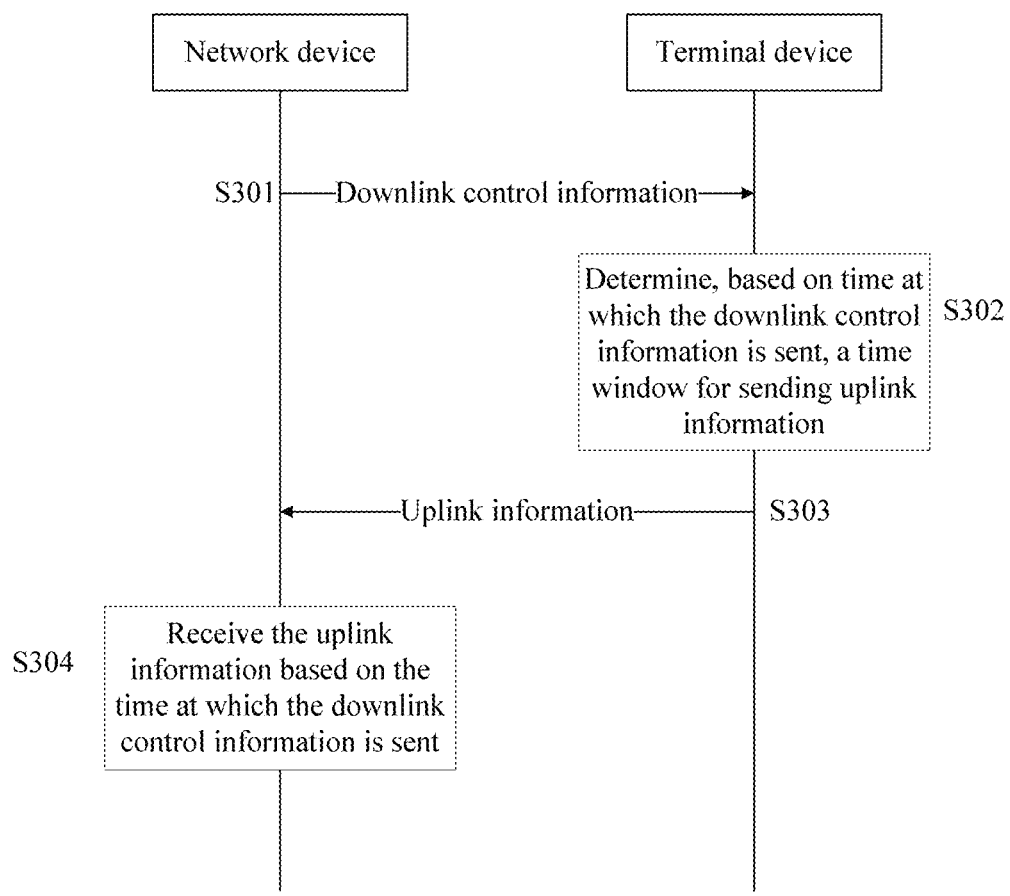
FIG. 3 is a schematic flowchart of a communication method on an unlicensed frequency band according to an embodiment of the present disclosure.

FIG. 3 is a schematic flowchart of a communication method on an unlicensed frequency band according to an embodiment of the present disclosure. The method specifically includes the following steps.

S301. A network device sends downlink control information within a first time unit, where the first time unit is included in a candidate time unit set, the candidate time unit set is at least one of a plurality of consecutive time units, and the candidate time unit sets are at an equal interval in the plurality of consecutive time units.

Correspondingly, a terminal device receives the downlink control information sent by the network device.

Specifically, an unlicensed frequency band may be divided into a plurality of consecutive time units in time domain, and the time unit may be a subframe. The candidate time unit set may include, for example, six candidate time units, and there is one candidate time unit set in every 40 consecutive time units. The network device successively performs CCA in the six time units included in the candidate unit set, and sends the downlink control information after the CCA succeeds. A time unit in which the downlink control signal is actually sent is the first time unit. If the network device does not have an opportunity of sending the downlink control signal within the six time units in the candidate unit set (for example, CCA fails), the network device needs to attempt to send the downlink control signal in a next candidate time unit set.

S302. The terminal device determines, based on time at which the downlink control information is sent, a time window for sending uplink information.

S303. The terminal device sends the uplink information within the time window.

S304. The network device receives the uplink information based on the time at which the downlink control information is sent.

A start moment T1 of the time window is within the first time unit or a second time unit, the second time unit is a next time unit of the first time unit, and an end moment of the downlink control information is T2.

The following details steps S302 to S304 by using an example in which the downlink control information is a DRS signal. A person skilled in the art may know that the following embodiment merely uses a DRS signal as an example for description. However, the protection scope of the present disclosure is not limited to a case in which the downlink control information is a DRS, and further includes any type of downlink control information manner that is mentioned in other parts of the present disclosure and that satisfies requirements of the embodiments of the present disclosure.

Figure 4:
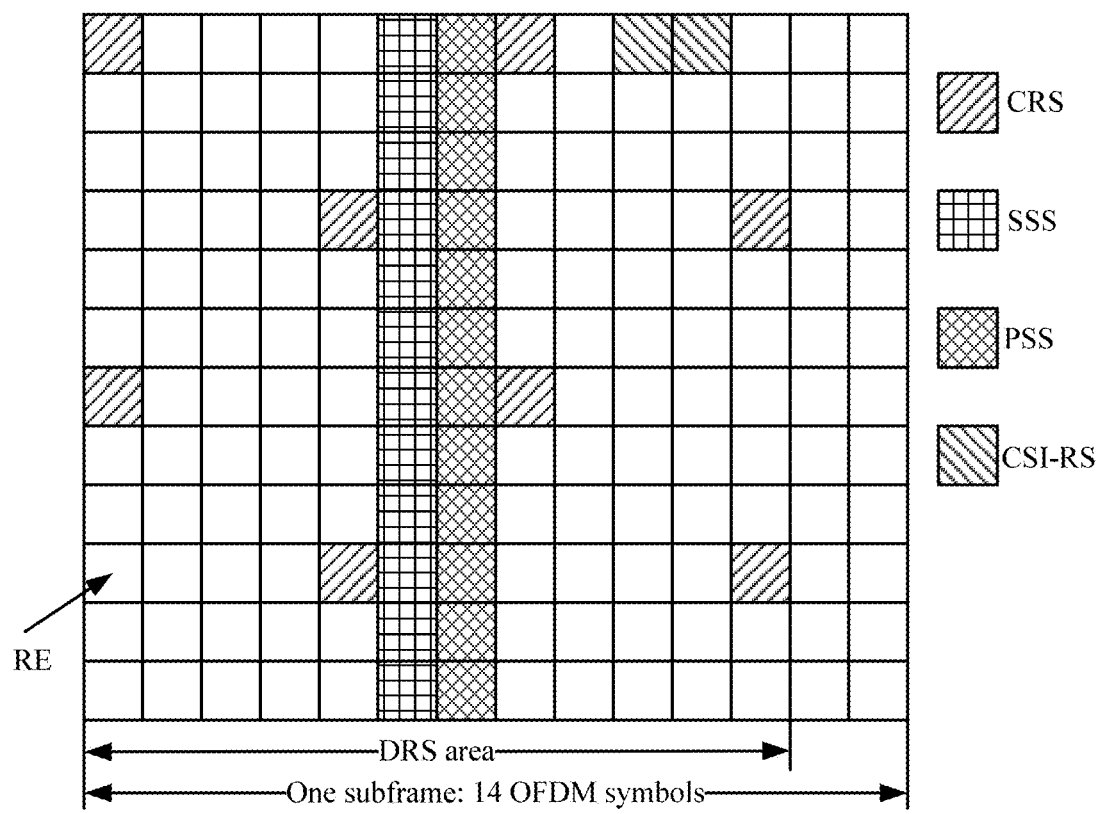
FIG. 4 is a schematic structural diagram of a DRS signal according to an embodiment of the present disclosure.

A specific structure of the DRS is shown in FIG. 4. A DRS area includes 12 OFDM symbols in time domain, but not all OFDM symbols are occupied by valid data. Using a physical resource block (PRB) pair as an example, the PRB is 1 ms in time domain and includes 12 subcarriers in frequency domain, and a resource element (RE) is one OFDM symbol in time domain and is one subcarrier in frequency domain.

In an optional embodiment of the present disclosure, the terminal device stops receiving the downlink control information at the moment T2, and the start moment of the time window for sending the uplink information by the terminal device is T1, and there is a time interval between T1 and T2. A location of the moment T1 may be set in a plurality of optional implementations. Details are as follows.

In an implementation, the location of the moment T1 is set, so that the terminal device does not receive downlink user data within the time interval between T1 and T2. For example, the network device does not send downlink user data within the time interval, or the terminal device does not receive downlink user data within the time interval, and it is equivalent that the network device has not sent the downlink user data. For another example, the time interval between T1 and T2 that is not enough to perform one downlink user data transmission scheduling is set. This can avoid that new downlink user data starts to be transmitted when the time interval is so long that the new downlink user data is allowed to be transmitted. This implementation can ensure that other downlink user data transmission is not performed after the terminal device receives the downlink control information and before the terminal device sends the uplink information, and avoid interruption or termination of downlink user data transmission that is performed by the network device within the time interval, thereby improving efficiency of transmitting data on the unlicensed frequency band.

In another implementation, the moment T1 is a start moment of the second time unit, or T2 is an $n^{th}$ OFDM symbol within the first time unit, and T1 is an $(n+2)^{th}$ OFDM symbol within the first time unit. For example, T2 is an end moment of an $n^{th}$ OFDM symbol within the first time unit, and T1 is a start moment of an $(n+2)^{th}$ OFDM symbol within the first time unit.

Figures 1, 5:
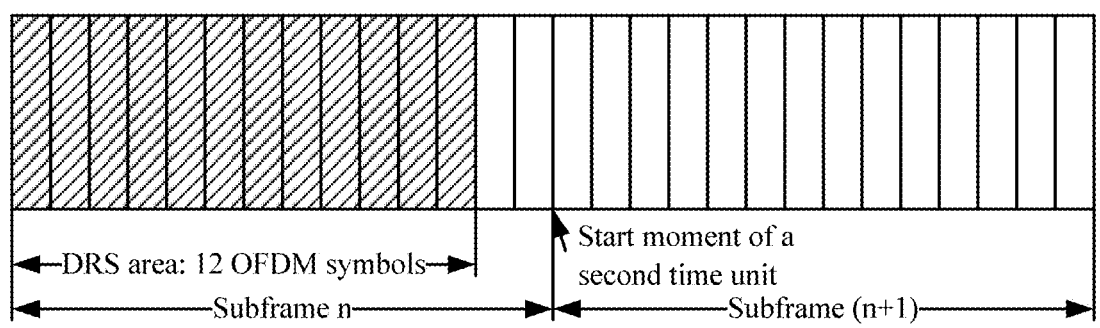
Figures 2, 5:
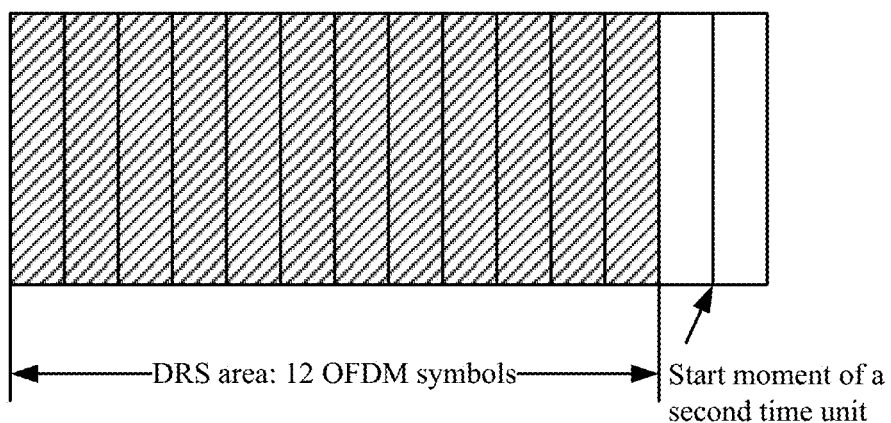
Figures 3, 5:
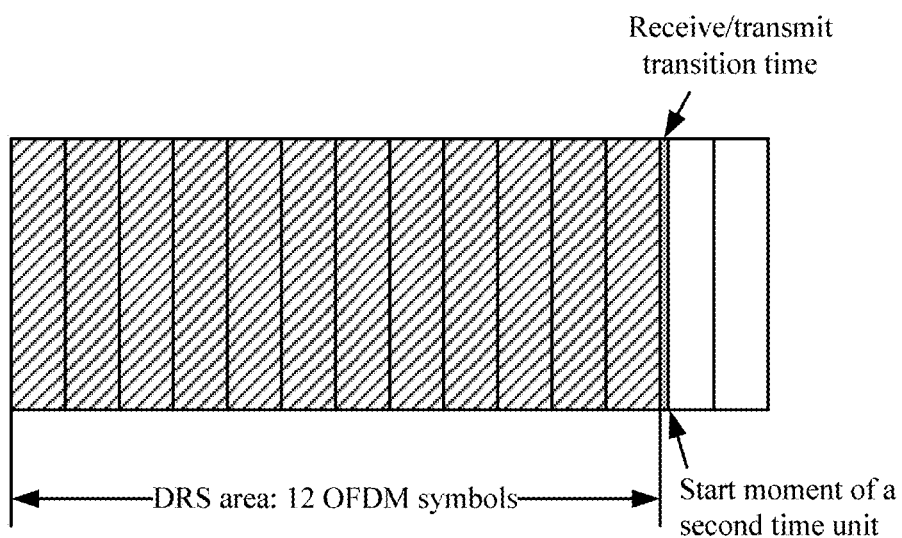

For details, refer to FIG. 5-1 and FIG. 5-2. The network device sends a DRS in a subframe n, and the terminal device detects or receives the DRS in the subframe n, and stops receiving the DRS at the moment T2. In this case, a start moment of a subframe (n+1) or a start moment of a fourteenth symbol in the subframe n is used as the start moment T1 of the time window. In this implementation, a delay that may occur during downlink control information transmission is considered, and that the start moment T1 of the time window for sending the uplink information starts from a complete time boundary can be ensured.

In still another implementation, T1 is a moment at which only a receive/transmit transition time expires after the moment T2. For the network device, the receive/transmit transition time includes a transition time between stopping sending downlink user data and starting to receive uplink data by the network device. For the terminal device, the receive/transmit transition time includes a transition time between stopping receiving downlink user data and starting to send uplink data by the terminal device. For example, for the network device, the receive/transmit transition time may not be greater than 17 microseconds, for the terminal device, the receive/transmit transition time may not be greater than 20 microseconds.

That the uplink information is a PRACH is used as an example. For details, refer to FIG. 5-3. The network device sends a DRS in a subframe n, where a DRS area includes 12 OFDM symbols in time domain, and the terminal device detects or receives the DRS in the subframe n, and stops receiving the DRS at the moment T2. The start moment of the time window for sending the uplink information by the terminal device is the moment T1 at which a receive/transmit transition time expires after the moment T2, that is, a moment at which the receive/transmit transition time expires after a thirteenth OFDM symbol included in the subframe n. In this implementation, after receiving the DRS, the terminal device may send the uplink information immediately when the receive/transmit transition time expires. This avoids that a channel is preempted by another communications device, and improves efficiency of transmission on the unlicensed frequency band.

In another optional embodiment of the present disclosure, the candidate time unit set is at least one of a plurality of consecutive time units, and the candidate time unit set may include one or more time units.

For example, when the candidate time unit set includes one time unit, the network device sends the downlink control information within the time unit, and the terminal device detects and receives the downlink control information within the time unit.

For another example, when the candidate time unit set includes a plurality of time units, the network device sends the downlink control information within one of the plurality of time units, and the terminal device detects and receives the downlink control information.

For example, when the downlink control information is a DRS, a periodic time window that is corresponding to DRS measurement time configuration (DMTC) may be used to send the DRS. The network device determines a DRS sending location through CCA and sends the DRS. The DMTC may be a time period whose length is 6 ms, that is, 6 subframes, or the DMTC is a configurable time period, for example, a time period whose length ranges from 1 ms to 10 ms, that is, 1 subframe to 10 subframes. Each subframe may be used to send the DRS, and a location that may be used to send the DRS occupies 12 symbols of each subframe.

Further, the candidate time unit sets are at an equal interval in the plurality of consecutive time units, that is, the candidate time unit sets are periodically configured in the plurality of consecutive time units. In this implementation, although a location, in the candidate time unit set, of a time unit used by the terminal device to receive the downlink control information is variable, the terminal device can receive the downlink control information within a period of each candidate time unit set, and the terminal device can send the uplink information within each period.

In another optional embodiment of the present disclosure, the terminal device determines, based on the downlink control information, the time window for sending the uplink information, and sends the uplink information within the time window. Before sending the uplink information, the terminal device may perform clear channel assessment CCA or may not perform clear channel assessment CCA. A specific implementation may be as follows.

In an implementation, the time interval between the moment T2 at which the terminal device stops receiving the downlink control information and the start moment T1 of the time window for sending the uplink information is so short that another communications device cannot content for or preempt an unlicensed frequency band resource. Therefore, the terminal device does not need to perform a CCA operation before sending the uplink information.

In another implementation, the terminal device performs CCA before sending the uplink information. The CCA may be performed within the time window or beyond the time window.

For example, after stopping receiving the downlink control information, the terminal device completes the CCA operation before start of the time window. In other words, time within the time window is not occupied by the CCA operation.

For another example, the terminal device performs CCA assessment within the time window, and the terminal device sends the uplink information after the CCA assessment succeeds. When the time window includes a plurality of time units, the terminal device may perform CCA assessment before or at a start moment of each time unit, until the CCA assessment succeeds. If determining that a time unit in the time window is idle, the terminal device starts to send the uplink information.

It should be noted that in this implementation, time at which CCA assessment is performed may be different depending on whether a listening mechanism includes a random backoff. This is not specifically limited herein.

In another optional embodiment of the present disclosure, the terminal device sends the uplink information within the time window. The start moment T1 of the time window may be configured in a plurality of manners.

For example, the moment T1 is specified by a standard protocol. According to the standard protocol, the terminal device sends the uplink information by using the time window whose start moment is T1.

For another example, the moment T1 is configured by using signaling. The signaling may be Radio Resource Control (RRC) signaling, Media Access Control (MAC) signaling, or physical layer signaling. Further, the signaling may be broadcast signaling in the RRC signaling, may be physical layer common control signaling, may be group broadcast signaling in the RRC signaling that is valid only for some terminal devices in a system, or may be physical layer group common control signaling that is valid only for some terminal devices in a system.

For still another example, the start moment T1 of the time window may be instructed by the network device to the terminal device by using a common control channel. The common control channel may be sent together with the downlink control information within a same time unit, for example, the first time unit, or another preconfigured or usable time unit. Optionally, the time unit carrying the common control channel may be periodically distributed.

In another optional embodiment of the present disclosure, the terminal device sends the uplink information within the time window. A length of time, in the time window, for sending the uplink information may be invariable or may be configured depending on requirements. For example, the length of time for sending the uplink information may be one OFDM symbol, one subframe, one timeslot (0.5 millisecond), or an integral quantity of other OFDM symbols. For another example, a length of a time resource for sending the uplink information may be preconfigured or may be informed by using signaling. Specifically, the time length is directly defined by a standard protocol, or the time length is configured by using signaling, where the signal may be RRC signaling, MAC signaling, or physical layer signaling (for example, physical layer common control signaling).

In another optional embodiment of the present disclosure, the network device further sends indication information, and the terminal device receives the indication information, and determines, based on the indication information, whether to send the uplink information within the time window. The indication information may be used to indicate the terminal device whether the time window exists or indicate whether the terminal device is allowed to send the uplink information within the time window. There may be a plurality of following implementations of the indication information.

In an implementation, the terminal device determines, based on whether the indication information is found, whether the time window exists or whether the uplink information is allowed to be sent within the time window. For example, if the terminal device does not find the indication information, it indicates the terminal device that the time window exists or indicates that the terminal device is allowed to send the uplink information within the time window, and the terminal device sends the uplink information within the time window. For another example, if the terminal device finds the indication information, it indicates the terminal device that the time window exists or indicates that the terminal device is allowed to send the uplink information within the time window, and the terminal device sends the uplink information within the time window. For still another example, if the terminal device finds the indication information, it indicates the terminal device that the time window does not exist or indicates that the terminal device is not allowed to send the uplink information within the time window, and the terminal device does not send the uplink information within the time window. For yet another example, if the terminal device does not find the indication information, it indicates the terminal device that the time window does not exist or indicates that the terminal device is not allowed to send the uplink information within the time window, and the terminal device does not send the uplink information within the time window.

In another implementation, the indication information is used to indicate the terminal device whether the time window exists or indicate whether the terminal device is allowed to send the uplink information within the time window. For example, if the indication information indicates the terminal device that the time window exists or the terminal device is allowed to send the uplink information within the time window, the terminal device sends the uplink information within the time window. For another example, if the indication information indicates the terminal device that the time window does not exist or the terminal device is not allowed to send the uplink information within the time window, the terminal device does not send the uplink information within the time window. In this implementation, the terminal device may directly determine, based on content indicated by the indication information, whether to send the uplink information within the time window.

In the foregoing implementation, optionally, the indication information may be common control information. Using the common control information to send the indication information to the terminal device can reduce signaling overheads. Further, optionally, the common control information may be further used to indicate an end location of downlink data burst including the indication information. The downlink data burst may be understood as a time length of consecutively transmitting downlink data by the network device on an unlicensed frequency band resource after the network device preempts the unlicensed frequency band resource. In this manner, an existing signaling design may be used without using an additional design manner. This reduces design complexity of a communications system.

Figures 1, 6:
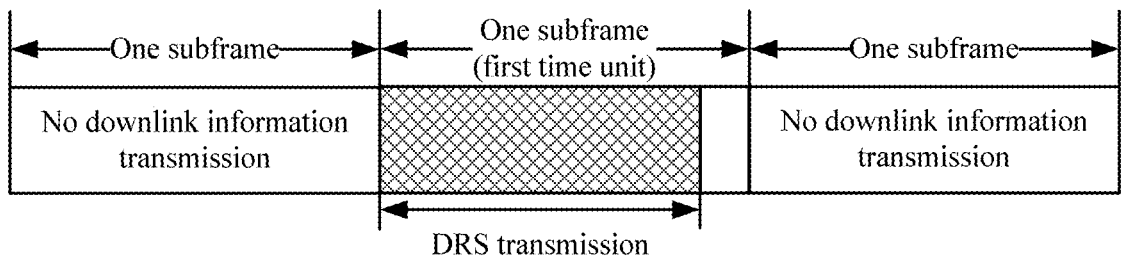
Figures 2, 6:
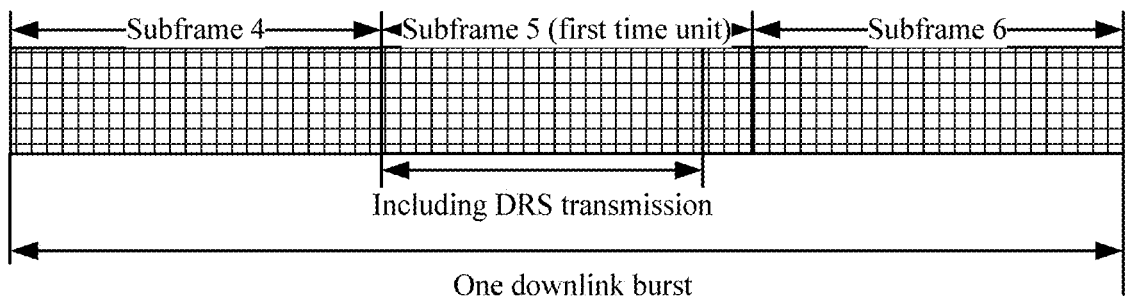

It should be noted that in each candidate time unit set on the unlicensed frequency band resource, the network device may send only the downlink control information (as shown in FIG. 6-1), or send the downlink control information and the indication information, or send downlink user data in addition to the downlink control information or in addition to the downlink control information and the indication information. As shown in FIG. 6-2 (the first time unit is represented by a subframe 5), the downlink user data includes data carried on a physical downlink shared channel (PDSCH), where the data is not broadcast data, may include data carried on a physical downlink control channel (PDCCH), may include data carried on enhanced physical downlink control channel (E-PDCCH), or may include data carried on a physical broadcast channel (PMCH). The downlink user data may further include a downlink reference signal. The downlink reference signal includes at least one of the following a cell-specific reference signal (CRS), a multimedia broadcast multicast service signal frequency network reference signal (MBSFN RS), a UE-specific reference signal used to demodulate data carried on a PDSCH, a reference signal (DM-RS) used to demodulate data carried on an EPDCCH or an MPDCCH, a positioning reference signal (PRS), and a channel state information reference signal (CSI-RS).

Optionally, when the candidate time unit set includes the downlink user data, in order not to affect a design of a frame structure on the unlicensed frequency band, the network device may instruct, by using the indication information, the terminal device not to send the uplink information within the time window or not to send the uplink information in some time units included in the time window. For details, refer to implementations in the following cases.

In a case, in addition to the downlink control information, the network device sends the downlink user data within the first time unit in the candidate time set. Because the start moment of the time window for sending the uplink information may be within the first time unit, sending of the downlink user data may collide with sending of the uplink information performed by the terminal device within the time window. As a result, sending of the downlink user data is terminated or interrupted, and transmission efficiency is affected. In this case, the network device sends the indication information to the terminal device, to instruct the terminal device not to send the uplink information within the time window, so that a collision with transmission of the downlink user data is avoided.

In another case, the time window includes some time units, and the some time units may be time units, in the candidate time unit set, for sending the downlink user data. The network device sends the indication information, to instruct the terminal device not send the uplink information within the some time units in the time window. In this case, the terminal device further needs to learn of the some time units included in the time window. For example, the terminal device determines the start moment of the time window, and then determines the some time units included in the time window based on the moment at which the network device stops sending the downlink user data in the candidate time unit set.

In still another case, the network device may further determine, in a plurality of manners, whether the terminal device is allowed to send the uplink information within the time window. For example, when the network device does not allow access by the terminal device, the network device needs to start to send new downlink control information or data after sending of the downlink control information ends. Alternatively, for other reasons, the network device does not allow the terminal device to send the uplink information. This is not specifically limited herein.

In this embodiment of the present disclosure, the network device may send the indication information at a plurality of locations, for example, within the first time unit, or within a time unit before the first time unit.

In another optional embodiment of the present disclosure, the receiving, by network device, the uplink information based on the time at which the downlink control information is sent may specifically include determining, by the network device, the time window based on the time at which the downlink control information is sent, and receiving the uplink information within the time window. A specific implementation of determining, by the terminal device, the time window based on the time at which the downlink control information is sent is also applicable to the network device. For details, refer to the specific descriptions of the foregoing operations of the terminal device.

Figure 7:
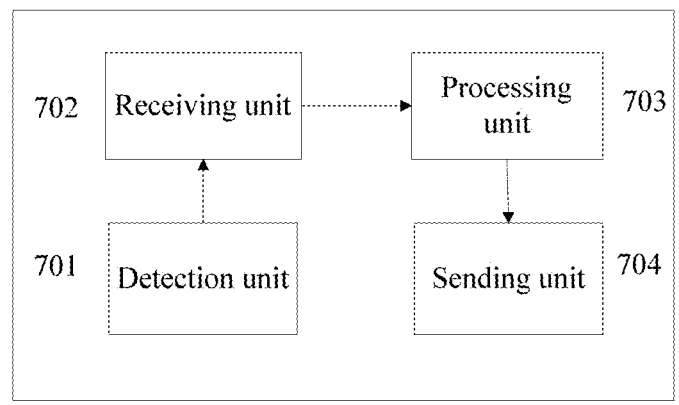
FIG. 7 is a possible schematic structural diagram of a terminal device according to an embodiment of the present disclosure.

FIG. 7 is a possible schematic structural diagram of a terminal device according to an embodiment of the present disclosure.

The terminal device includes a detection unit 704 a receiving unit 702, a processing unit 703, and a sending unit 704, and depending on an actual requirement, may further include a storage unit that is not shown in the figure.

The detection unit 701 is configured to detect whether there is downlink control information transmitted on an unlicensed frequency band.

The receiving unit 702 is configured to receive the downlink control information after the detection unit 701 finds the downlink control information.

A network device sends the downlink control information within a first time unit in a candidate time unit set, and the terminal device detects the downlink control information in the candidate time unit set, and receives the downlink control information within the first time unit.

Specifically, the candidate time unit set is at least one of a plurality of consecutive time units, and the candidate time unit sets are at an equal interval in the plurality of consecutive time units.

The processing unit 703 is configured to determine, based on time at which the downlink control information is sent, a time window for sending uplink information.

The sending unit 704 is configured to send the uplink information within the time window.

A start moment T1 of the time window is within the first time unit or a second time unit, the second time unit is a next time unit of the first time unit, and an end moment of the downlink control information is T2.

According to a communication method on an unlicensed frequency band provided in this embodiment of the present disclosure, a time interval between receiving of the downlink control information and sending of the uplink information is reduced, a design of a frame structure on the unlicensed frequency band is kept unchanged, and efficiency of transmitting data on the unlicensed frequency band is improved.

In an optional embodiment of the present disclosure, the function of the detection unit 701 may be implemented by the processing unit 703, or the detection unit 701 is integrated into the processing unit 703. In other words, the terminal device does not include an independent detection unit 701.

The following describes, by using an example in which the downlink control information is a DRS signal, a possible structure of the terminal device provided in this embodiment of the present disclosure. A person skilled in the art may know that the following embodiment merely uses a DRS signal as an example for description. However, the protection scope of the present disclosure is not limited to a case in which the downlink control information is a DRS, and further includes any type of downlink control information manner that is mentioned in other parts of the present disclosure and that satisfies requirements of the embodiments of the present disclosure.

In an optional embodiment of the present disclosure, the receiving unit 702 stops receiving the downlink control information at the moment T2, and the start moment of the time window for sending the uplink information by the sending unit 704 is T1, and there is a time interval between T1 and T2. A location of the moment T1 may be set in a plurality of optional implementations. Details are as follows.

In an implementation, the location of the moment T1 is set, so that the terminal device does not receive downlink user data within the time interval between T1 and T2. For example, the network device does not send downlink user data within the time interval, or the terminal device does not receive downlink user data within the time interval, and it is equivalent that the network device has not sent the downlink user data. For another example, the time interval between T1 and T2 that is not enough to perform one downlink user data transmission scheduling is set. This can avoid that new downlink user data starts to be transmitted when the time interval is so long that the new downlink user data is allowed to be transmitted. This implementation can ensure that other downlink user data transmission is not performed after the terminal device receives the downlink control information and before the terminal device sends the uplink information, and avoid interruption or termination of downlink user data transmission that is performed by the network device within the time interval, thereby improving efficiency of transmitting data on the unlicensed frequency band.

In another implementation, T1 is a start moment of the second time unit, or T2 is an $n^{th}$ OFDM symbol within the first time unit, and T1 is an $(n+2)^{th}$ OFDM symbol within the first time unit. For example, T2 is an end moment of an $n^{th}$ OFDM symbol within the first time unit, and T1 is a start moment of an $(n+2)^{th}$ OFDM symbol within the first time unit.

Specifically, the network device sends a DRS in a subframe n, the detection unit 701 or the processing unit 703 finds the DRS in the subframe n, and the receiving unit 702 stops receiving the DRS at the moment T2. In this case, a start moment of a subframe (n+1) or a start moment of a fourteenth symbol in the subframe n is used as the start moment T1 of the time window. In this implementation, a delay that may occur during downlink control information transmission is considered, and that the start moment T1 of the time window for sending the uplink information starts from a complete time boundary can be ensured.

In still another implementation, T1 is a moment at which only a receive/transmit transition time expires after the moment T2.

In another optional embodiment of the present disclosure, the candidate time unit set is at least one of a plurality of consecutive time units, and the candidate time unit set may include one or more time units.

For example, when the candidate time unit set includes one time unit, the network device sends the downlink control information within the time unit, the detection unit 701 or the processing unit 703 finds the downlink control information within the time unit, and the receiving unit 702 receives the downlink control information.

For another example, when the candidate time unit set includes a plurality of time units, the network device sends the downlink control information within one of the plurality of time units, the detection unit 701 or the processing unit 703 finds the downlink control information, and the receiving unit 702 receives the downlink control information.

Further, the candidate time unit sets are at an equal interval in the plurality of consecutive time units, that is, the candidate time unit sets are periodically configured in the plurality of consecutive time units.

In another optional embodiment of the present disclosure, the processing unit 703 determines, based on the downlink control information, the time window for sending the uplink information, and instructs the sending unit 704 to send the uplink information within the time window. Before sending the uplink information, the processing unit 703 may perform clear channel assessment CCA or may not perform clear channel assessment CCA. A specific implementation may be as follows.

In an implementation, the time interval between the moment T2 and T1 is so short that another communications device cannot content for or preempt an unlicensed frequency band resource. Therefore, the sending unit 704 does not need to perform a CCA operation before sending the uplink information.

In another implementation, the processing unit 703 performs CCA before the sending unit 704 sends the uplink information. The CCA may be performed within the time window or beyond the time window.

For example, after the receiving unit 702 stops receiving the downlink control information, the processing unit 703 completes the CCA operation before start of the time window. In other words, time within the time window is not occupied by the CCA operation.

For another example, the processing unit 703 performs CCA assessment within the time window, and the sending unit 704 sends the uplink information after the CCA assessment succeeds. When the time window includes a plurality of time units, the processing unit 703 may perform CCA assessment before or at a start moment of each time unit, until the CCA assessment succeeds. If determining that a time unit in the time window is idle, the processing unit 703 instructs the sending unit 704 to send the uplink information.

In another optional embodiment of the present disclosure, the terminal device sends the uplink information within the time window, and the start moment T1 of the time window and a time length may be configured in a plurality of manners. For a specific configuration manner, refer to the description of the method embodiment corresponding to FIG. 3. Details are not described herein again.

In another optional embodiment of the present disclosure, the network device further sends indication information. The receiving unit 702 receives the indication information, and the processing unit 703 obtains the indication information from the receiving unit 702, and informs, based on the indication information, the sending unit 704 whether to send the uplink information within the time window. For a plurality of implementations of the indication information, refer to the description of the method embodiment corresponding to FIG. 3.

Optionally, in each candidate time unit set on the unlicensed frequency band resource, the network device may send only the downlink control information, or send the downlink control information and the indication information, or send downlink user data in addition to the downlink control information or in addition to the downlink control information and the indication information. When the candidate time unit set includes the downlink user data, in order not to affect the design of the frame structure on the unlicensed frequency band, the network device may instruct, by using the indication information, the terminal device not to send the uplink information within the time window. The receiving unit 702 receives the indication information, and the processing unit 703 obtains the indication information from the receiving unit 702, determines whether to send the uplink information, and informs the sending unit 704 whether to send the uplink information.

The terminal device provided in this embodiment of the present disclosure detects the downlink control information sent by the network device, determines the time window for sending the uplink information, and sends the uplink information. According to the solutions in this embodiment of the present disclosure, the time interval between sending of the uplink information and receiving of the downlink control information is reduced, the design of the frame structure on the unlicensed frequency band unchanged is kept unchanged, and efficiency of transmitting data on the unlicensed frequency band is improved.

The terminal device in this embodiment of the present disclosure may be configured to perform the method in the method embodiment corresponding to FIG. 3. For specific implementations in which the terminal device receives the downlink control information, determines the time window for sending the uplink information, and sends the uplink information, refer to the description of the method embodiment. Specific functions of the detection unit 701, the receiving unit 702, the processing unit 703, and the sending unit 704 that are included in the terminal device are corresponding to the functions in the embodiment corresponding to FIG. 3. Terms and implementation details thereof are similar to those in the method embodiment.

It should be noted that in actual application, the functional units of the terminal device in this embodiment may be implemented by using corresponding hardware, or may be implemented by corresponding hardware executing corresponding software. For example, the receiving unit 702 may be hardware that performs a function of the receiving module, such as a receiver, or may be a general-purpose processor or another hardware device that can execute a corresponding computer program to implement the foregoing function. For another example, the sending unit 704 may be hardware that performs a function of the sending module, such as a transmitter, or may be a general-purpose processor or another hardware device that can execute a corresponding computer program to implement the foregoing function. For still another example, the processing unit 703 may be independent hardware that performs a function of a processing module, such as a processor, or may be another hardware device that can execute a corresponding computer program to implement the foregoing function. Further, the detection unit 701 may be independent hardware that performs a function of a detection module, such as a detector. Alternatively, the detection unit may be integrated into the processing unit 703, a function of the detection unit is implemented by hardware that performs a function of a processing module, such as a processor, and the detection unit 701 is not disposed alone.

It should be noted that this terminal device embodiment is based on a concept the same as that in the method embodiment, and brings a technical effect the same as that of the method embodiment of the present disclosure. For specific content, refer to the description of the method embodiment of the present disclosure. Details are not described herein again.

Figure 8:
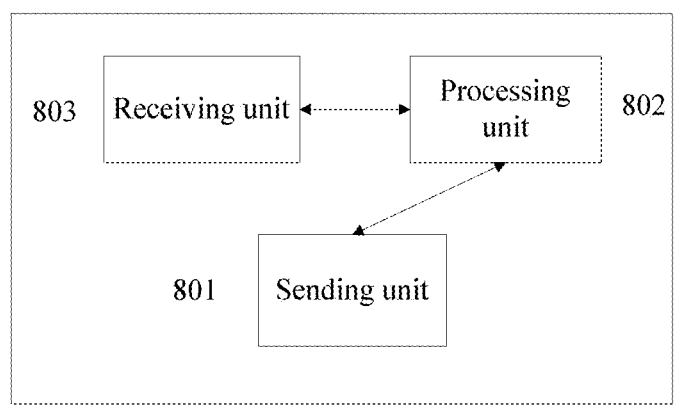
FIG. 8 is a possible schematic structural diagram of a network device according to an embodiment of the present disclosure.

FIG. 8 is a possible schematic structural diagram of a network device according to an embodiment of the present disclosure.

The network device includes a sending unit 801, a processing unit 802, and a receiving unit 803, and depending on an actual requirement, may further include a storage unit that is not shown in the figure.

The sending unit 801 sends downlink control information in a candidate time unit set on an unlicensed frequency band, where the downlink control information is received by a terminal device. The sending unit 801 sends the downlink control information within a first time unit in the candidate time unit set.

Specifically, the candidate time unit set is at least one of a plurality of consecutive time units, and the candidate time unit sets are at an equal interval in the plurality of consecutive time units.

The receiving unit 803 receives, based on time at which the downlink control information is sent, uplink information sent by the terminal device. The terminal device determines, based on the time at which the downlink control information is sent, a time window for sending the uplink information. A start moment T1 of the time window is within the first time unit or a second time unit, the second time unit is a next time unit of the first time unit, and an end moment of the downlink control information is T2.

The processing unit 802 determines the candidate time unit set in which the downlink control information is sent, and determines the first time unit.

The following describes, by using an example in which the downlink control information is a DRS signal, a possible structure of the network device provided in this embodiment of the present disclosure. A person skilled in the art may know that the following embodiment merely uses a DRS signal as an example for description. However, the protection scope of the present disclosure is not limited to a case in which the downlink control information is a DRS, and further includes any type of downlink control information manner that is mentioned in other parts of the present disclosure and that satisfies requirements of the embodiments of the present disclosure.

In an optional embodiment of the present disclosure, the sending unit 801 sends the downlink control information within the first time unit in the candidate time unit set. The terminal device stops receiving the downlink control information at the moment T2 (in consideration of a network delay, the moment at which the sending unit 801 stops sending the downlink control information may be slightly earlier than the moment T2, and herein the moment T2 is used as a reference for the moment at which the terminal device stops receiving the downlink control information), the start moment of the time window for sending the uplink information by the terminal device is T1, and there is a time interval between T1 and T2. There are a plurality of optional implementations for a location design of the moment T2. For a specific implementation, refer to the description of the method embodiment corresponding to FIG. 3. Details are not described herein again.

It should be noted that the sending unit 801 of the network device does not send downlink user data within the time interval between T1 and T2. For example, the processing unit 802 informs the sending unit that the time interval is not enough to perform one downlink user data transmission scheduling, and the sending unit 801 does not send downlink user data. For another example, no matter whether the time interval is enough to perform one downlink user data transmission scheduling, the processing unit 802 instructs the sending unit 801 not to send downlink user data within the time interval, because the terminal device does not receive downlink user data within the time interval.

In another optional embodiment of the present disclosure, the candidate time unit set is at least one of a plurality of consecutive time units, and the candidate time unit set may include one or more time units.

For example, when the candidate time unit set includes one time unit, the sending unit 801 sends the downlink control information within the time unit.

For another example, when the candidate time unit set includes a plurality of time units, the processing unit 802 determines one time unit from the plurality of time units, and instructs the sending unit 801 to send the downlink control information within the determined time unit.

Further, the candidate time unit sets are at an equal interval in the plurality of consecutive time units, that is, the candidate time unit sets are periodically configured in the plurality of consecutive time units.

Further, optionally, the sending unit 801 further sends indication information, where the indication information is used to inform the terminal device whether to send the uplink information within the time window. Specifically, the indication information may be used to indicate the terminal device whether the time window exists or indicate whether the terminal device is allowed to send the uplink information within the time window. There may be a plurality of implementations of the indication information. For a specific implementation, refer to the description of the method embodiment corresponding to FIG. 3. Details are not described herein again.

It should be noted that in each candidate time unit set on an unlicensed frequency band resource, the processing unit 802 may instruct the sending unit 801 to send only the downlink control information, or send the downlink control information and the indication information, or send downlink user data in addition to the downlink control information or in addition to the downlink control information and the indication information.

Optionally, when content that is sent by the sending unit 801 in the candidate time unit set includes the downlink user data, in order not to affect a design of a frame structure on the unlicensed frequency band, the processing unit 802 may instruct, by using the indication information, the terminal device not to send the uplink information within the time window. Optionally, the processing unit 802 may further determine, in a plurality of manners, whether the terminal device is allowed to send the uplink information within the time window. For details, refer to the description of the method embodiment corresponding to FIG. 3. Details are not described herein again.

The network device in this embodiment of the present disclosure may be configured to perform the method in the method embodiment corresponding to FIG. 3. For specific implementations in which the network device determines the time unit for sending the downlink control information, sends the downlink control information, indicates whether the terminal device is allowed to send the uplink information within the corresponding time window, and the like, refer to the description of the method embodiment. Specific functions of the sending unit 801, the processing unit 802, and the receiving unit 803 that are included in the network device are corresponding to the functions in the embodiment corresponding to FIG. 3. Terms and implementation details thereof are similar to those in the method embodiment.

It should be noted that in actual application, the functional units of the network device in this embodiment may be implemented by using corresponding hardware, or may be implemented by corresponding hardware executing corresponding software. For example, the sending unit 801 may be hardware that performs a function of the sending module, such as a transmitter, or may be a general-purpose processor or another hardware device that can execute a corresponding computer program to implement the foregoing function. For another example, the processing unit 802 may be hardware that performs a function of a processing module, such as a processor, or may be another hardware device that can execute a corresponding computer program to implement the foregoing function. For still another example, the receiving unit 803 may be hardware that performs a function of the receiving module, such as a receiver, or may be a general-purpose processor or another hardware device that can execute a corresponding computer program to implement the foregoing function.

It should be noted that this network device embodiment is based on a concept the same as that in the method embodiment, and brings a technical effect the same as that of the method embodiment of the present disclosure. For specific content, refer to the description of the method embodiment of the present disclosure. Details are not described herein again.

It should be noted that in all the foregoing embodiments of the present disclosure, the time unit may be one radio frame, one subframe, one timeslot, or one symbol, or may be a plurality of radio frames, a plurality of subframes, a plurality of timeslots, or a plurality of symbols, and may be flexibly designed depending on an actual communications system requirement. Preferably, the time unit may be one subframe. The time window may include one or more time units, and the terminal device sends the uplink information within one of the one or more time units included in the time window. For example, when the time window includes one time unit, the terminal device sends the uplink information within the time unit. For example, when the time window includes a plurality of time units, the terminal device determines one time unit in the time window, and sends the uplink information within the determined time unit. The terminal device determines the time unit in the time window through channel listening. In such a manner, the time unit in the time window is a $1^{st}$ time unit, in the time window, after the terminal device determines that the unlicensed frequency band resource is preempted. Optionally, a length of each time unit in the candidate time unit set may be the same as or different from a length of each time unit in the time window.

In addition, it should be noted that in all the foregoing embodiments of the present disclosure, that the network device sends the downlink control information within the first time unit may include The network device sends the downlink control information within a time range, in the first time unit, used to transmit the downlink control information. For example, when the first time unit is one subframe, a time length corresponding to the time range, in the first time unit, used to transmit the downlink control information may be 1 ms, or may be less than 1 ms.

It should be understood that "one embodiment", "an embodiment", or "an embodiment of the present disclosure" mentioned in the whole specification means that particular features, structures, or characteristics related to the embodiment are included in at least one embodiment of the present disclosure. Therefore, "in one embodiment", "in an embodiment", or "in an embodiment of the present disclosure" that appears throughout the whole specification does not necessarily mean a same embodiment. Moreover, the particular features, structure or characteristics may be combined in one or more embodiments in any proper manner.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

The processor in the embodiments of the present disclosure may be a central processing unit (CPU), a general-purpose processor, a digital signal processor (DSP), an application-specific integrated circuit (ASIC), a field programmable-gate array (FPGA) or another programmable logic device, a transistor logic device, a hardware component, or any combination thereof. The processor can implement or execute various example logical blocks, modules, and circuits that are described with reference to the content disclosed in the present disclosure. The processor may alternatively be a combination implementing a computing function, for example, a combination of one or more microprocessors or a combination of a DSP and a microprocessor.

A person skilled in the art may know that for the terminal device or the network device, functions of the transmitter, the receiver, and the processor are not limited to cooperating in functions of performing procedures of the communications method provided in the embodiments of the present disclosure, and may further cooperate in others functions performed by the terminal device or the network device, for example, performing a basic communication function and various application programs. Details are not described herein.

It should be understood that in the embodiments of this application, "B corresponding to A" indicates that B is associated with A, and B may be determined according to A. However, it should also be understood that determining B according to A does not mean that B is determined according to A only, and B may also be determined according to A and/or other information.

The method steps described with reference to the content disclosed in the present disclosure may be implemented by using hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an application-specific integrated circuit (ASIC). In addition, the ASIC may be located in the terminal device or the network device. Certainly, the processor and the storage medium may exist in the terminal device or the network device as discrete assemblies.

The objectives, technical solutions, and beneficial effects of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

The foregoing mainly describes the solutions provided in the embodiments of the present disclosure from the perspective of interaction between network elements. It may be understood that, to implement the foregoing functions, various network elements, such as UE, a base station, and a core network entity include a corresponding hardware structure and/or software module for performing each function. A person skill in the art should be easily aware that, the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

When the integrated unit is implemented in a form of a software functional unit and sold or used as an independent product, the integrated unit may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random-access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
    receiving, by a terminal device, on an unlicensed frequency band, downlink control information sent by a network device, wherein the downlink control information is within a first time unit in a candidate time unit set in a plurality of candidate time unit sets, wherein the candidate time unit set is at least one of a plurality of consecutive time units, and wherein candidate time unit sets of the plurality of candidate time unit sets are at an equal interval in the plurality of consecutive time units;
    determining, by the terminal device according to a time at which the downlink control information is sent, a time window for sending uplink information;
    sending, by the terminal device, the uplink information within the time window, wherein a start moment of the time window (T1) is within the first time unit or a second time unit immediately after the first time unit, and wherein an end moment of the downlink control information is T2; and
    skipping receiving, by the terminal device, downlink user data within a time interval between T1 T2.

2. The method according to claim 1, wherein the T1 is a start moment of the second time unit; or
    wherein T2 is an $n^{th}$ OFDM symbol within the first time unit, and T1 is an $(n+2)^{th}$ OFDM symbol within the first time unit.

3. The method according to claim 1, wherein a time interval T between T1 and T2 is a receive/transmit transition time.

4. The method according to claim 1 wherein the sending the uplink information within the time window comprises:
    performing clear channel assessment (CCA); and
    sending the uplink information after the CCA succeeds.

5. The method according to claim 1, wherein the downlink control information comprises at least one of a discovery reference signal (DRS) or common control information.

6. The method according to claim 1, wherein the uplink information comprises one or more of uplink information in a random access process, an uplink transmission scheduling request (SR), a sounding reference signal (SRS), or periodic channel state information (P-CSI).

7. The method according to claim 1, further comprising:
    receiving, by the terminal device, indication information; wherein the indication information indicates to the terminal device at least one of whether the time window exists or whether the terminal device is allowed to send the uplink information within the time window.

8. The method according to claim 7, wherein the indication information indicates, when downlink user data sent by the network device exists in the first time unit, at least one of the time window not existing or the uplink information not being allowed to be sent within the time window.

9. The method according to claim 1, wherein the time unit is a subframe.

10. A communication method, comprising:
sending, by a network device, on an unlicensed frequency band, downlink control information within a first time unit, wherein the first time unit is disposed in a candidate time unit set in a plurality of candidate time unit sets, wherein the candidate time unit set is at least one of a plurality of consecutive time units, and wherein candidate time unit sets of the plurality of candidate time unit sets are at equal intervals in the plurality of consecutive time units;
receiving, by the network device, uplink information based on a time at which the downlink control information is sent, wherein the uplink information is within a time window, wherein a start moment of the time window (T1) is within the first time unit or a second time unit immediately after the first time unit, and wherein an end moment of the downlink control information is T2; and
skipping sending, by the network device, downlink user data within a time interval between T1 and T2.

11. The method according to claim 10, wherein the T1 is a start moment of the second time unit; or
wherein T2 is an $n^{th}$ OFDM symbol within the first time unit, and T1 is an $(n+2)^{th}$ OFDM symbol within the first time unit.

12. The method according to claim 10, wherein a time interval T between T1 and T2 is a receive/transmit transition time.

13. The method according to claim 10, wherein the downlink control information comprises at least one of a discovery reference signal (DRS) or common control information.

14. The method according claim 10, wherein the uplink information comprises at least one or more of uplink information in a random access process, a sounding reference signal (SRS), an uplink transmission scheduling request (SR), or periodic channel state information (P-CSI).

15. The method according to claim 10, further comprising sending, by the network device, indication information, wherein the indication information indicates to a terminal device at least one of whether the time window exists or whether the terminal device is allowed to send the uplink information within the time window.

16. The method according to claim 15, wherein the indication information indicates, when the network device sends downlink user data within the first time unit, to the terminal device at least one of that the time window does not exist or that the terminal device is not allowed to send the uplink information within the time window.

17. An apparatus, comprising:
one or more processors, and
a non-transitory computer-readable storage medium storing a program to be executed by the one or more processors, the program including instructions for:
receiving downlink control information sent by a network device, wherein the downlink control information is within a first time unit in a candidate time unit set in a plurality of candidate time unit sets, wherein the candidate time unit set is at least one of a plurality of consecutive time units, and wherein candidate time unit sets of the plurality of candidate time unit sets are at equal intervals in the plurality of consecutive time units;
determining, based on time at which the downlink control information is sent, a time window for sending uplink information;
sending the uplink information within the time window wherein a start moment of the time window (T1) is within the first time unit or a second time unit immediately after the first time unit, and wherein an end moment of the downlink control information is T2; and
skipping receiving downlink user data within a time interval between T1 and T2.

18. The apparatus according to claim 17, wherein the instructions for sending the uplink information within the time window include instructions for:
performing clear channel assessment (CCA); and
sending the uplink information after the CCA succeeds.

* * * * *

UNITED STATES PATENT AND TRADEMARK OFFICE
CERTIFICATE OF CORRECTION

PATENT NO. : 10,772,126 B2
APPLICATION NO. : 16/233504
DATED : September 8, 2020
INVENTOR(S) : Juan Zheng Page 1 of 1

It is certified that error appears in the above-identified patent and that said Letters Patent is hereby corrected as shown below:

In the Claims

In Column 24, Line 41, Claim 1, delete "T1 T2" and insert --T1 and T2--.

Signed and Sealed this
First Day of December, 2020

Andrei Iancu
*Director of the United States Patent and Trademark Office*